(12) United States Patent
Slater (10) Patent No.: US 11,072,546 B2
(45) Date of Patent: Jul. 27, 2021

(54) DECOMPLEXATION OF CHELATED HARDNESS AT HIGH PH

(71) Applicant: ConocoPhillips Company, Houston, TX (US)

(72) Inventor: Peter Nelson Slater, Bartlesville, OK (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 57 days.

(21) Appl. No.: 16/368,505

(22) Filed: Mar. 28, 2019

(65) Prior Publication Data

US 2019/0300401 A1    Oct. 3, 2019

Related U.S. Application Data

(60) Provisional application No. 62/651,671, filed on Apr. 2, 2018.

(51) Int. Cl.
| | | |
|---|---|---|
| *C02F 1/52* | (2006.01) | |
| *C02F 1/68* | (2006.01) | |
| *E21B 43/24* | (2006.01) | |
| *C02F 1/72* | (2006.01) | |
| *C02F 103/10* | (2006.01) | |
| *C02F 101/20* | (2006.01) | |

(52) U.S. Cl.
CPC ............ *C02F 1/683* (2013.01); *C02F 1/5245* (2013.01); *E21B 43/2408* (2013.01); *C02F 1/722* (2013.01); *C02F 2101/20* (2013.01); *C02F 2103/10* (2013.01); *C02F 2305/023* (2013.01)

(58) Field of Classification Search
CPC ....................................................... C02F 1/683
See application file for complete search history.

(56) References Cited

U.S. PATENT DOCUMENTS

| | | | | |
|---|---|---|---|---|
| 4,938,876 | A * | 7/1990 | Ohsol ..................... | B01D 17/00 210/177 |
| 5,632,900 | A * | 5/1997 | Jevec ...................... | C02F 1/025 210/721 |
| 2012/0108473 | A1 | 5/2012 | Pich et al. | |
| 2012/0285891 | A1 * | 11/2012 | Lundy ...................... | C02F 1/66 210/668 |
| 2015/0336808 | A1 | 11/2015 | Sloane et al. | |

(Continued)

OTHER PUBLICATIONS

Rämöa J. & Sillanpää M., Degradation of EDTA by hydrogen peroxide in alkaline conditions, Journal of Cleaner Production 9(3): 191-195 (2001).

(Continued)

*Primary Examiner* — Peter Keyworth
(74) *Attorney, Agent, or Firm* — Boulware & Valoir (57) ABSTRACT

A process for removing metals and chelators from SAGD liner flowback that can be implemented at the wellhead using temporary tankage and equipment. In the first step, caustic is added to the flowback until the concentration of hydroxyl ion is high enough for the metals (Fe, Ca, Mg) to dissociate from the metal-chelate complexes and precipitate as hydroxides. In the second step, hydrogen peroxide is added and allowed to react until all of the chelator molecules are oxidized and decomposed. Once treated, the flowback can proceed to the CPF.

15 Claims, 9 Drawing Sheets

(56) References Cited

U.S. PATENT DOCUMENTS

2016/0326443 A1* 11/2016 Young .................. C10G 33/04

OTHER PUBLICATIONS

Sillanpää M., Pirkanniemi K., & Sorokin A., Oxidation of EDTA with H2O2 catalysed by metallophthalocyanines, Environmental Technology 30(14): 1593-1600 (2009).
Kudrashou Y.V., Stimulation Design and Evaluation of High Temperature SAGD Wells, Master's Thesis (2015).
Canadian Office Action dated Aug. 4. 2020 in Canadian Application No. 3,038,411, filed Mar. 29, 2019 for Decomplexation of Chelated Hardness at High PH.
Canadian Office Action dated Feb. 22, 2021 in Canadian Application No. 3,038,411, filed Mar. 29, 2019 for Decomplexation of Chelated Hardness At High PH.

* cited by examiner

DECOMPLEXATION PRECIPITATE

GENERAL INFORMATION

| SAMPLE NAME | E170424-003 | MEASUREMENT DATE | 2017/04/27 11:06:15 |
|---|---|---|---|
| FILE NAME | DECOMPLEXATION PRECIPITATE | OPERATOR | HEMANGI SHEDGE |

QUANTITATIVE ANALYSIS RESULTS

| PHASE NAME | FORMULA | CONTENT (%) |
|---|---|---|
| BRUCITE | Mg (O H)2 | 60.15 |
| SODIUM CHLORIDE | Na Cl | 5.99 |
| ANORTHITE, SODIAN | Ca0.86 Na0.14 Al1.94 Si2.06 O8 | 0.29 |
| SODIUM TECTO-ALUMOSILICATE | Na20 (Al20 Si76 O192) | 2.25 |
| WONESITE-M1 | Na.46 K.09 Mg2.13 Fe.42 Al0.39 (Al0.88 Si3.12 O10) (O H)2 | 5.18 |
| IRON CATENA-SILICATE | Fe Si O3 | 8.50 |
| SODALITE | Na8 (Al6 Si6 O24) Cl2 | 2.75 |
| HYPOTHETICAL SILICA | Si O2 | 2.01 |
| HEDENBERGITE, SODIAN, SYN | (Ca0.506 Na0.494) Fe (Si2 O6) | 0.23 |
| ITQ-12, SILICON DIOXIDE | Si O2 | 2.19 |
| SODIUM DITHIONATE DIHYDRATE | Na2 S2 O6 (H2 O)2 | 10.44 |

PHASE DATA PATTERN

DECOMPLEXATION OF CHELATED HARDNESS AT HIGH PH

This application claims priority to U.S. Ser. No. 62/651,671, filed Apr. 2, 2018, which is expressly incorporated by reference herein it its entirety for all purposes.

FIELD OF THE DISCLOSURE

This disclosure pertains to treating the flowback from stimulated wells to remove metals and chelators.

BACKGROUND OF THE DISCLOSURE

Steam assisted gravity drainage or "SAGD" is a well-known and reliable enhanced oil recovery ("EOR") method that is widely used for development of heavy oil reservoirs. In traditional SAGD, two parallel horizontal wells are drilled, one nearly directly over the other at a vertical separation of about 4-10 meters, to form a SAGD well-pair. Steam is injected for 3-5 months into both wells until the wells are in fluid communication ("start-up"), at which time, the lower well is switched over to production and steam is only injected into the upper well. The heat imparted by the steam reduces the viscosity of the heavy crude, and the now mobilized oil can gravity drain to the lower production well. At the same time, steam rises, heating an ever-increasing steam chamber around the injection well and mobilizing additional oil.

Although very beneficial in producing heavy oils, SAGD can also cause formation and equipment damage. Serious formation damage occurs during steam injection because of the complex chemical reactions and hydrothermal effects in the reservoir, especially for poorly consolidated and high clay-content sandstones. The degree of damage is a function of the composition and properties of injected fluid, flow rate, and mineralogy of the reservoir. These problems include scale deposition, fines migration and wettability changes. In addition, sand production, corrosion products, and damage due to asphaltene precipitation are some addition problems seen with sandstone formations.

Once this kind of damage occurs, production decreases, and the well must be stimulated to increase production. This type of damage is usually treated with acid washes. During acid or scale-removal treatments, various compounds may be dissolved in the treatment fluid. As the acid reacts and the pH increases, reaction products may precipitate as a gelatinous, insoluble mass. Should this occur within the formation matrix, it is almost impossible to remove and permanent permeability damage may occur.

Chelating agents prevent precipitation by keeping ions in a soluble form until the treatment fluid can be flowed back from the formation during cleanup. Typical oilfield chelating agents include EDTA (ethylenediamine tetraacetic acid), DTPA (diethylenetriamine pentaacetic acid), HEDTA (hydroxyethylenediamine triacetic acid), NTA (nitriolotriacetic acid) and citric acid.

Although acid wash is a common method of stimulating wells, under certain conditions it can make matters worse. The use of HCl, for example, is associated with face dissolution, corrosion, and iron precipitation. Organic acids are weak and less corrosive than HCl, but they have limitations in that they can't be used at high concentrations.

The next option would be chelating agents. Chelating agents are used in well stimulation, iron control during acidizing, and removal of inorganic scales. Chelators such as ethylenediamine tetraacetic acid (EDTA), N-(hydroxyethyl)-ethylenediamine tetraacetic acid (HEDTA), L-glutamic acid-N, N diacetic acid (GLDA), and nitrilotriacetic acid (NTA) are used in high-pressure/high-temperature oil and gas wells.

Another enhanced oil recovery technique is alkaline flooding, also known as caustic flooding, in which an alkaline chemical such as sodium hydroxide (NaOH), sodium orthosilicate ($Na_4SiO_4$) or sodium carbonate ($Na_2CO_3$) is injected during polymer flooding or waterflooding operations. The alkaline chemical reacts with certain types of oils, forming surfactants inside the reservoir. Eventually, the surfactants reduce the interfacial tension between oil and water and trigger an increase in oil production. Alkaline flooding is not recommended for carbonate reservoirs because of the abundance of calcium: the mixture between the alkaline chemical and the calcium ions can produce hydroxide precipitation that may damage the formation.

We have tested the chelator EDTA in our wells as a method of stimulating liners that have slowed production. Stimulating SAGD production wells with EDTA is effective, but chelated hardness in the flowback fluid negatively impacts the central processing facility ("CPF"), causing the once through steam generator ("OTSG") to foul, and the like. In fact, the initial flowback from stimulated wells contains high concentrations of metals, such as Fe, Ca, Mg, as well as chelants such as EDTA or DTPA.

The solution to date has been to segregate and dispose of the early flowback volumes (100-300 $m^3$) that have high levels of metal-chelate. However, segregation and disposal of the contaminated flowback is expensive. Further, hydrocarbons in the early flowback, such as bitumen, are lost with the disposal fluids. This loss of product reduces the cost effectiveness of the procedure.

Thus, what is needed in the art are better method of stimulating SAGD production liners and reservoirs to reduce the damage cause by high temperature steam processes in clays and sandstones. The ideal method would protect the CPF from damage caused by any reagents used in the stimulation.

SUMMARY OF THE DISCLOSURE

SAGD liner stimulations with the chelating agents DTPA and EDTA have proven very effective in field trials. However, the initial flowback has high levels of metal chelate and has severely upset the CPF. Chelators can transport metals through the CPF water treatment to the OTSG units, where they decompose and rapidly foul the steam generators. To prevent these problems, the early flowback is sequestered, stored and trucked offsite for disposal, but at significant expense.

Described herein is a two-step field process for removing chelated metals from the flowback and then destroying the chelators so that the flowback water can return to the CPF without causing fouling problems at the plant. This process allows us to avoid the trucking and disposal costs, and provides the ability to perform liner stimulations more frequently. In addition, the bitumen in the early flowback is no longer lost, but is collected at the oil and water separator, thus contributing to production levels.

In the first step of the inventive method, caustic is added to the flowback until the concentration of hydroxyl ion is high enough for the metals (Fe, Ca, Mg) to dissociate from the metal-chelate complexes and precipitate as hydroxides. The solubility of each of these metal hydroxides is known, and thus a simple titration will provide optimal caustic levels for each well stimulation. In the second step, hydrogen peroxide is added and allowed to react until all of the chelator molecules are oxidized. Lab analyses have verified the completion of both steps, and confirmed that 90% or more of the metal and chelator can be removed. Once treated, the flowback is returned to the CPF and treated as normal, although if preferred it could be handled in other ways.

The metal hydroxide precipitants can be allowed to settle in the bottom of the tank, and can be purged at suitable intervals. The use of flocculants and/or coagulants will assist in this process. In the alternative, the precipitants can be collected by filtration, filtration through sand, by clarifier, or sedimentation tank.

The base used in the method can be any suitable source of hydroxide ions, including sodium hydroxide (NaOH), sodium silicate, sodium orthosilicate, and the like, but preferably avoiding the addition of extra ions such as calcium or magnesium when already high in concentration, as Mg and Ca ions are implicated in fouling and scaling in the OTSG's. Sodium (Na), by contrast, does not cause any problems that we are aware of, plus, the water is usually already briny.

The base separates the metal-chelate into metal (M) and chelator, per equation 1.

$$MC \leftrightarrow M + C \qquad \text{EQ. 1}$$

The metal hydroxide precipitation reaction is as follows:

$$M_{(aq)}^{++} + 2(OH^-) \leftrightarrow M(OH)_{2(s)} \qquad \text{EQ. 2}$$

Figure 1:
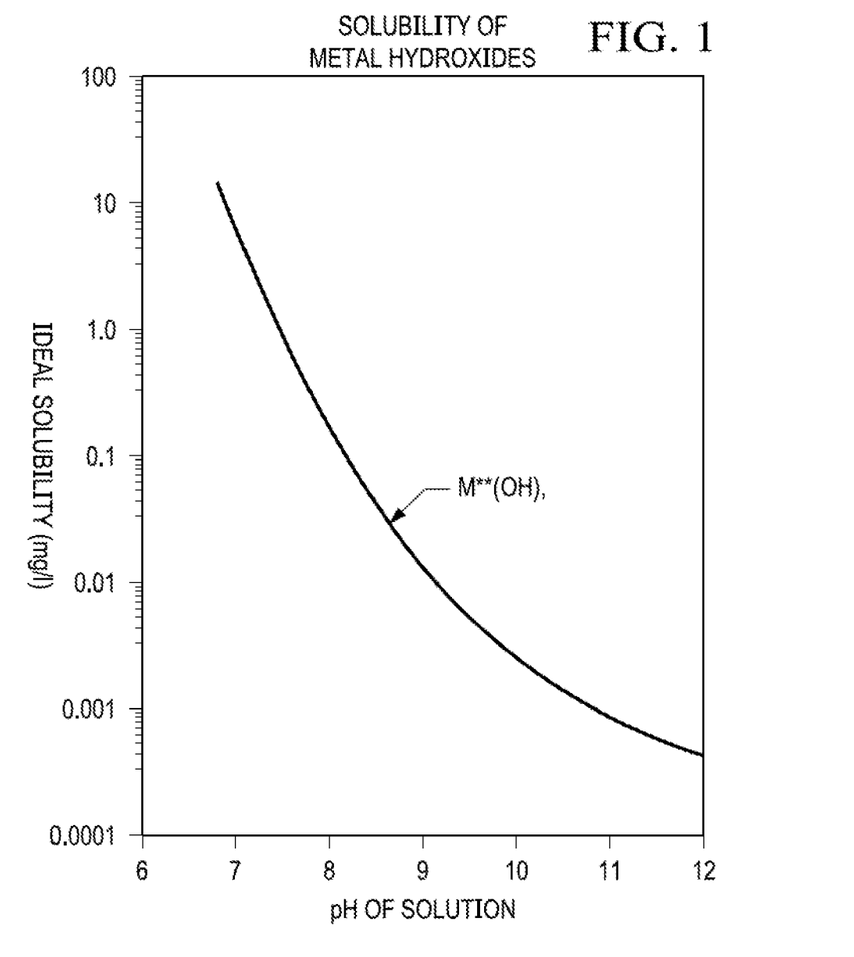
FIG. 1. Solubility of metal hydroxides.

As base and pH increase, solubility goes down. See FIG. 1. It is important not to add too much base, however, because the metal hydroxide precipitate combines with additional hydroxide to form a soluble metal complex. Thus, as the pH increases, the reaction proceeds to the right and the metal again becomes more soluble.

$$M(OH)_{2(s)} + OH^- \leftrightarrow M(OH)_3^-{}_{(aq)} \qquad \text{EQ. 3.}$$

Figure 2:
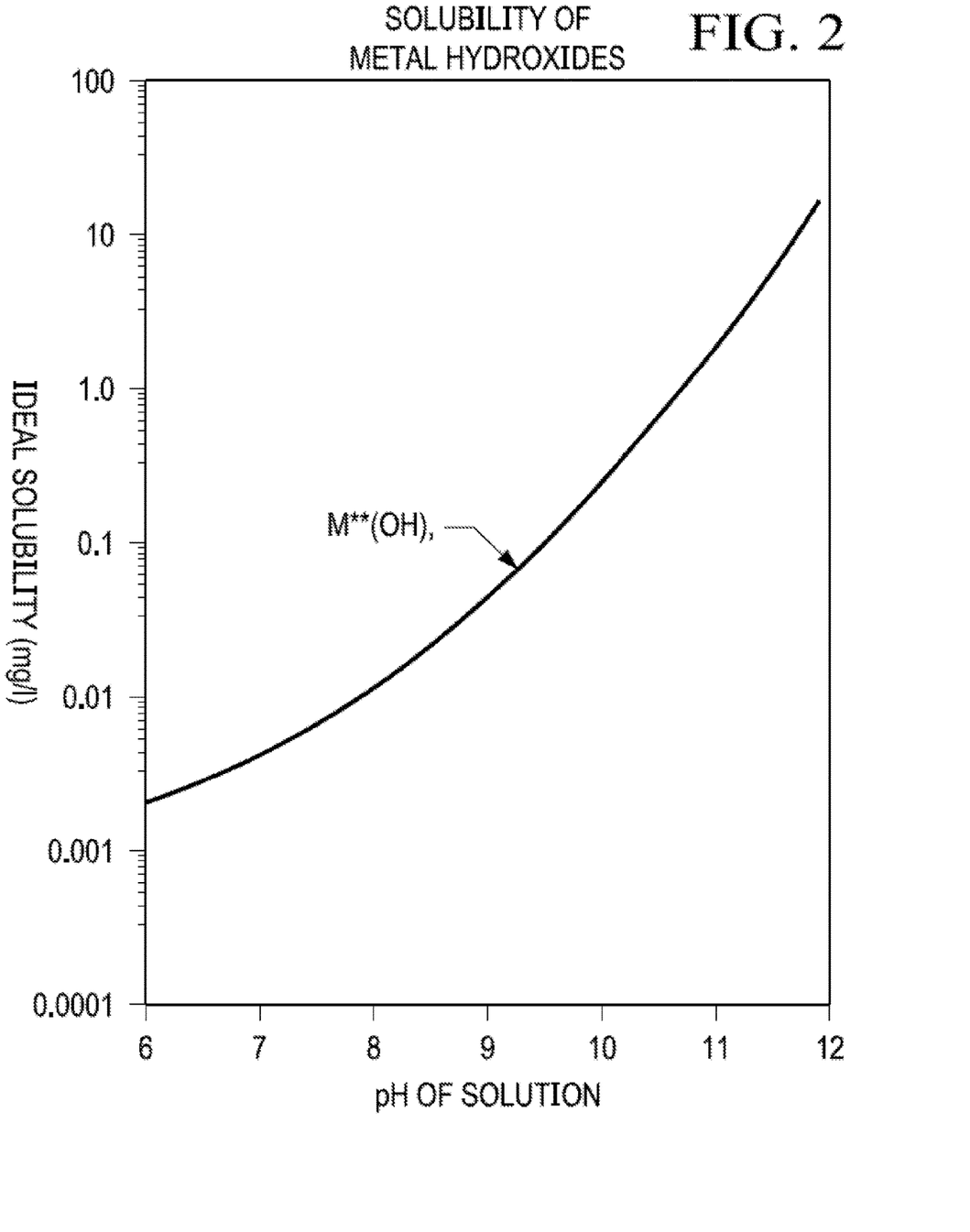
FIG. 2. Solubility of metal hydroxides.
Figure 3:
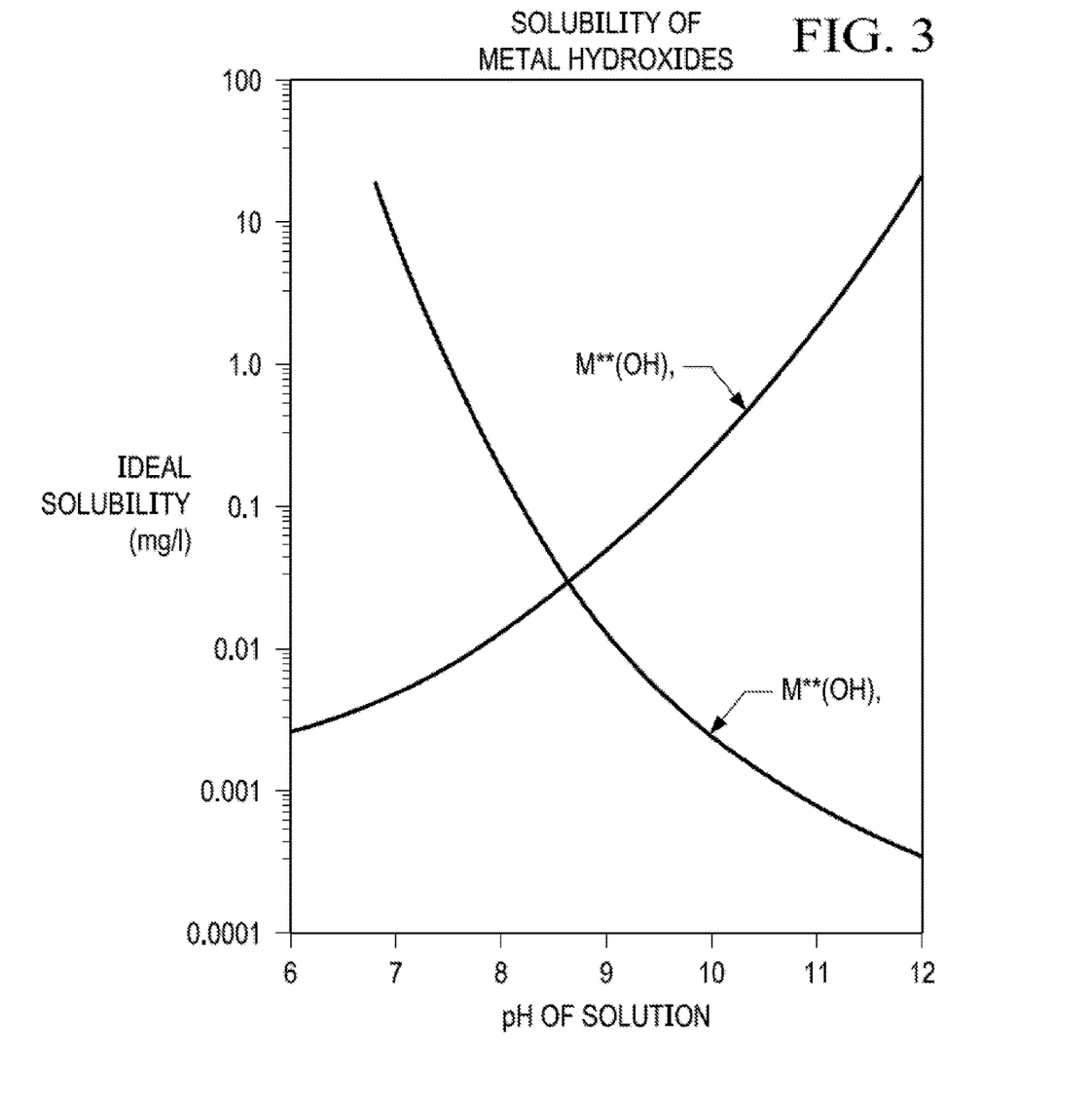
FIG. 3 Overlay of solubility curves from FIG. 1 and FIG. 2.
Figure 4:
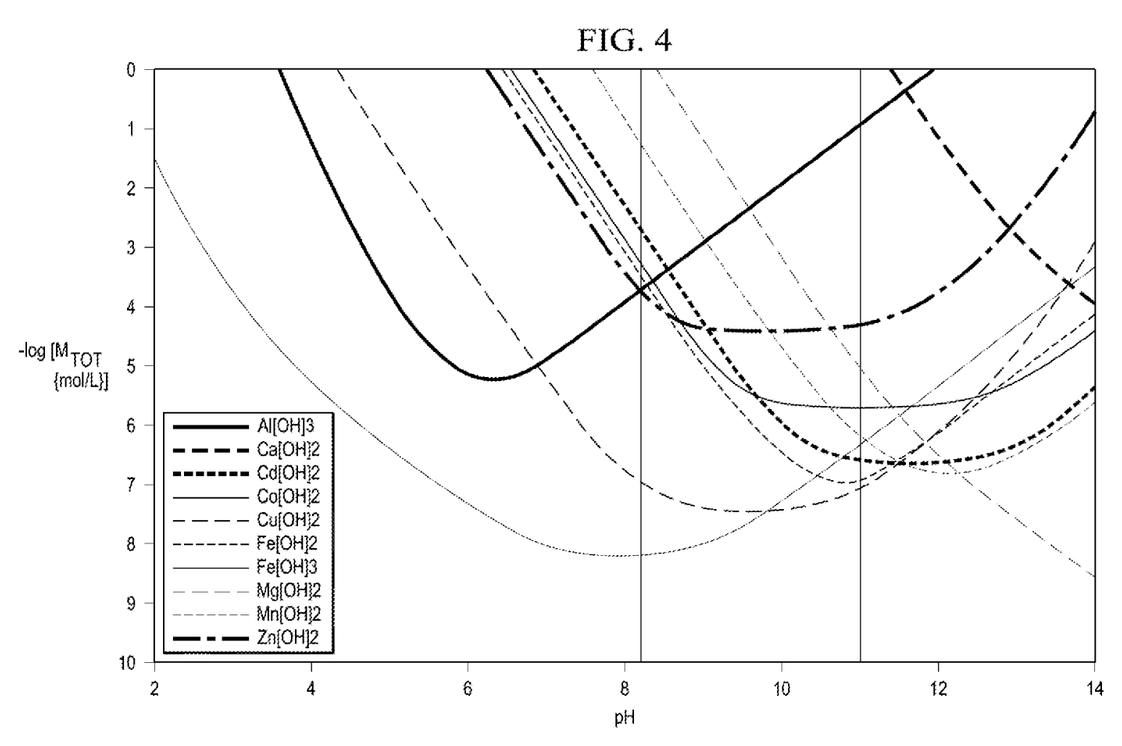
FIG. 4 Solubility curves for several metal hydroxides with changing pH.

The solubility curve of the reaction in EQ. 3 approximately mirrors the curve of the first reaction of FIG. 1, and is shown in FIG. 2. By overlaying these two curves, as shown in FIG. 3, the familiar V-shaped solubility curve for metal hydroxides is obtained. The lowest point of this curve identifies the absolute lowest concentration of a particular metal that can be achieved under ideal conditions by alkaline precipitation technology. To obtain this concentration, the pH must be maintained precisely at the indicated pH; any variation in pH will cause the metals to resolubilize. In a flowback stream with multiple metals, this problem becomes even more serious because the low point occurs at a different pH for each of the metals. Any operating pH chosen is therefore a compromise; one metal may be at its lowest point, but all others may be elevated on their respective curves as shown by FIG. 4. Thus, the pH levels are preferably optimized based on simple lab tests (e.g., as described herein) before the method is implemented in new wells.

Figure 5:
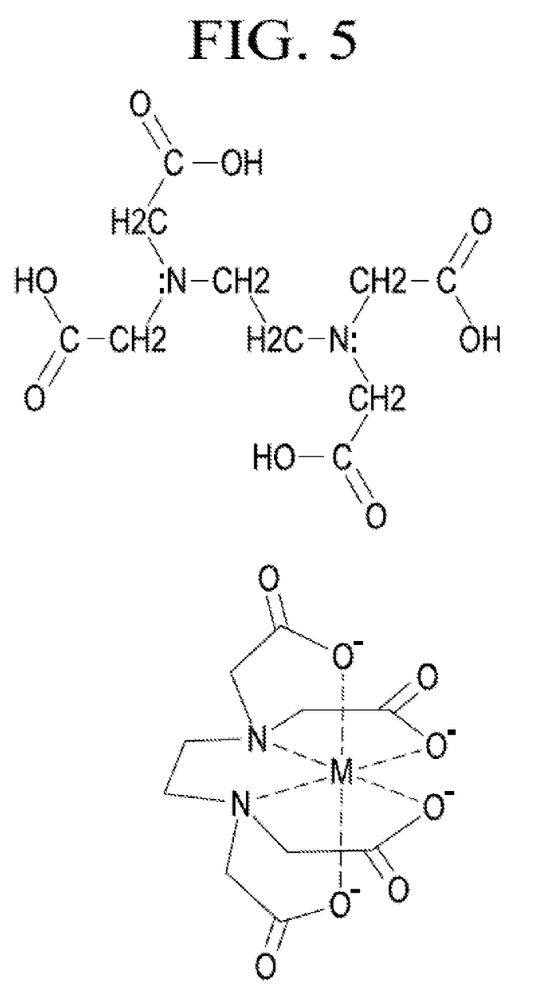
FIG. 5. EDTA and EDTA metal complexes.

Chelators for use in the invention include any known in the art or to be developed for use in the art. A common chelator is ethylenediamine triacetic acid (EDTA), shown in FIG. 5 both alone and as complexed with a metal. Others include diethylenetriamine pentaacetic acid (DTPA), nitrilotriacitic acid (NTA), and hydroxyethylethylenediamine triacetic (HEDTA) acid and water-soluble salts thereof.

Figure 6:
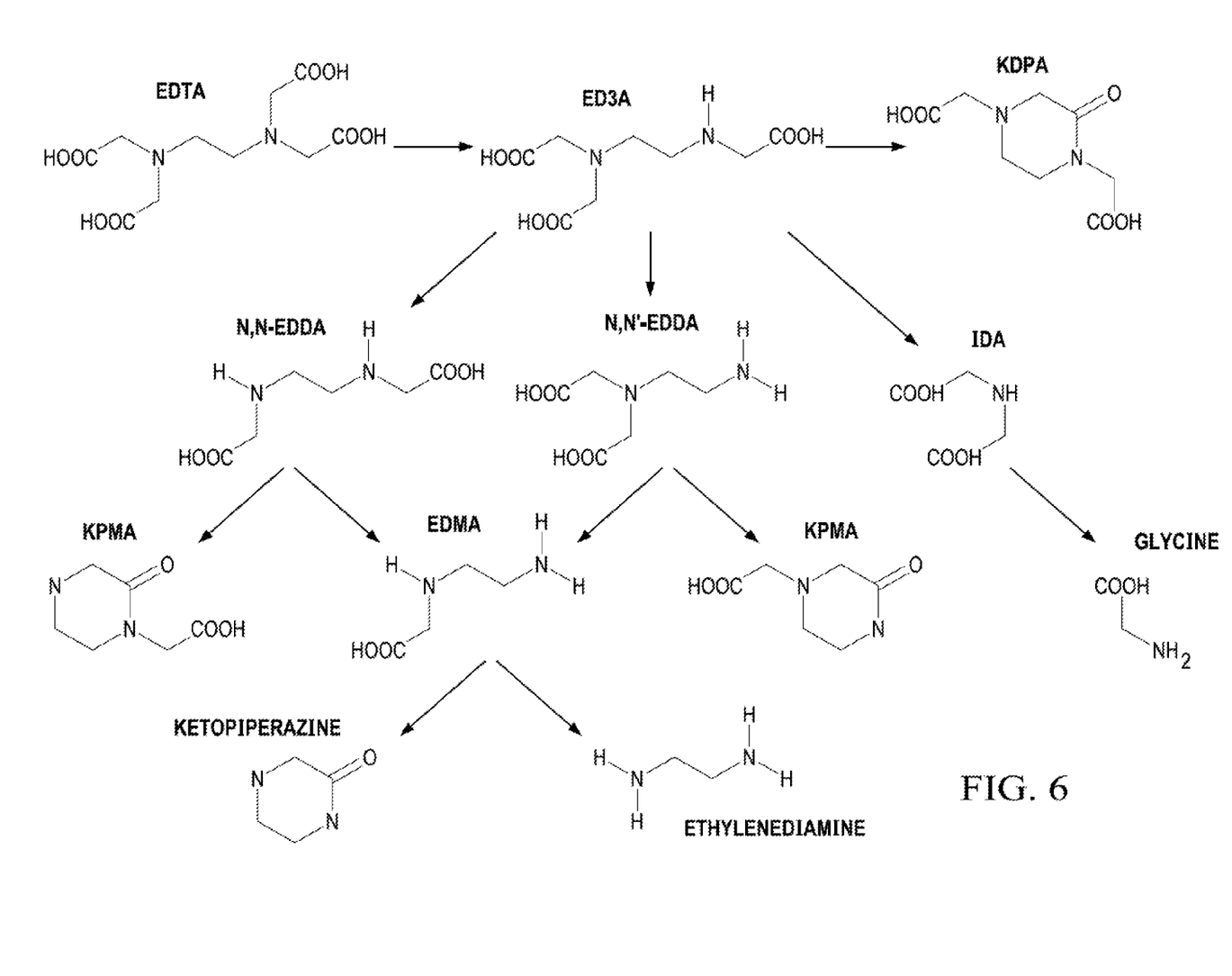
FIG. 6 Proposed and identified degradation pathways for EDTA.
Figure 7A:
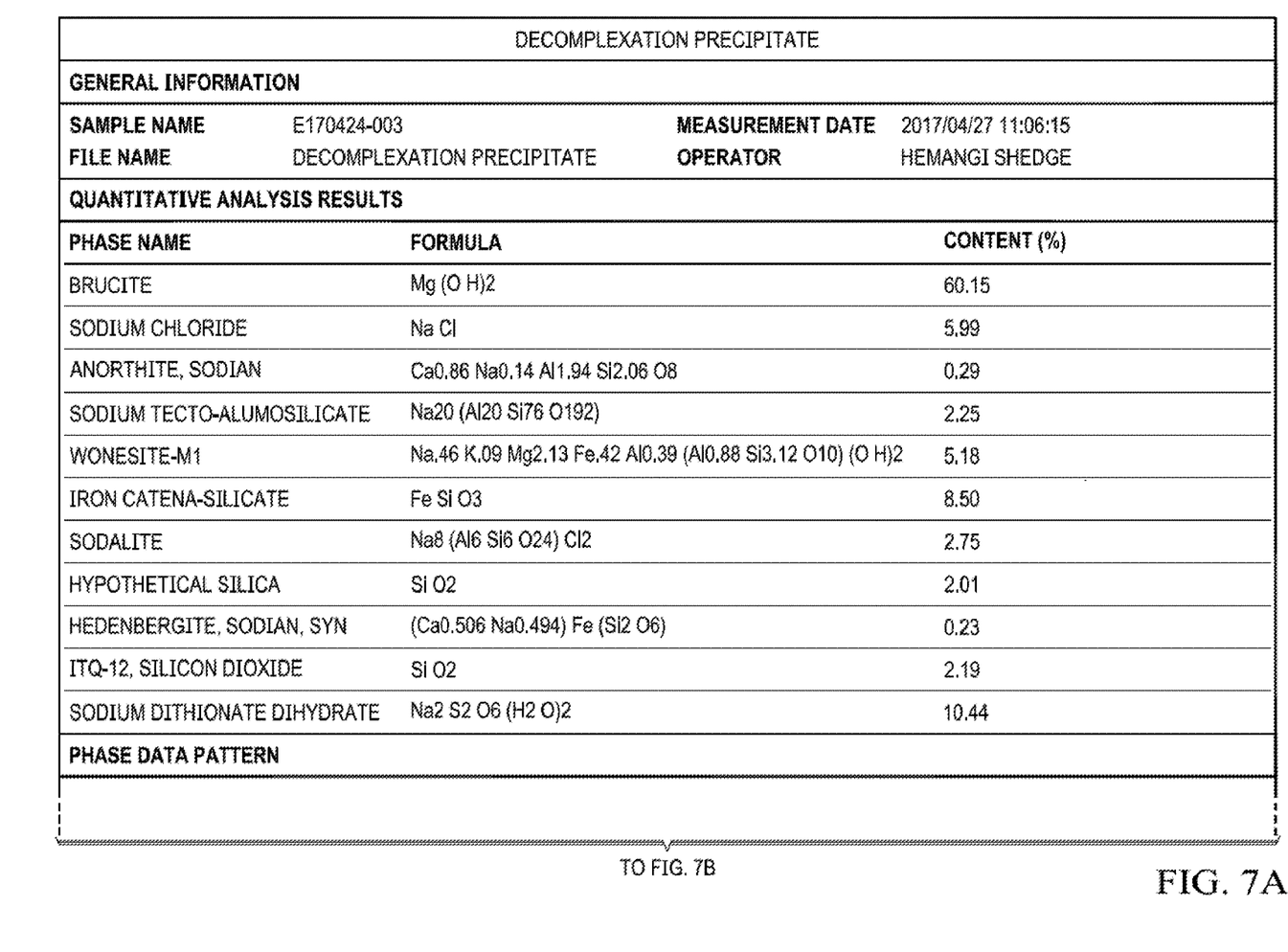
FIG. 7B. X-ray diffraction (XRD) spectra of the decomplexation precipitate and different components of the precipitate. This data was used to provide the estimated amounts in the table in FIG. 7A.
Figure 7B:
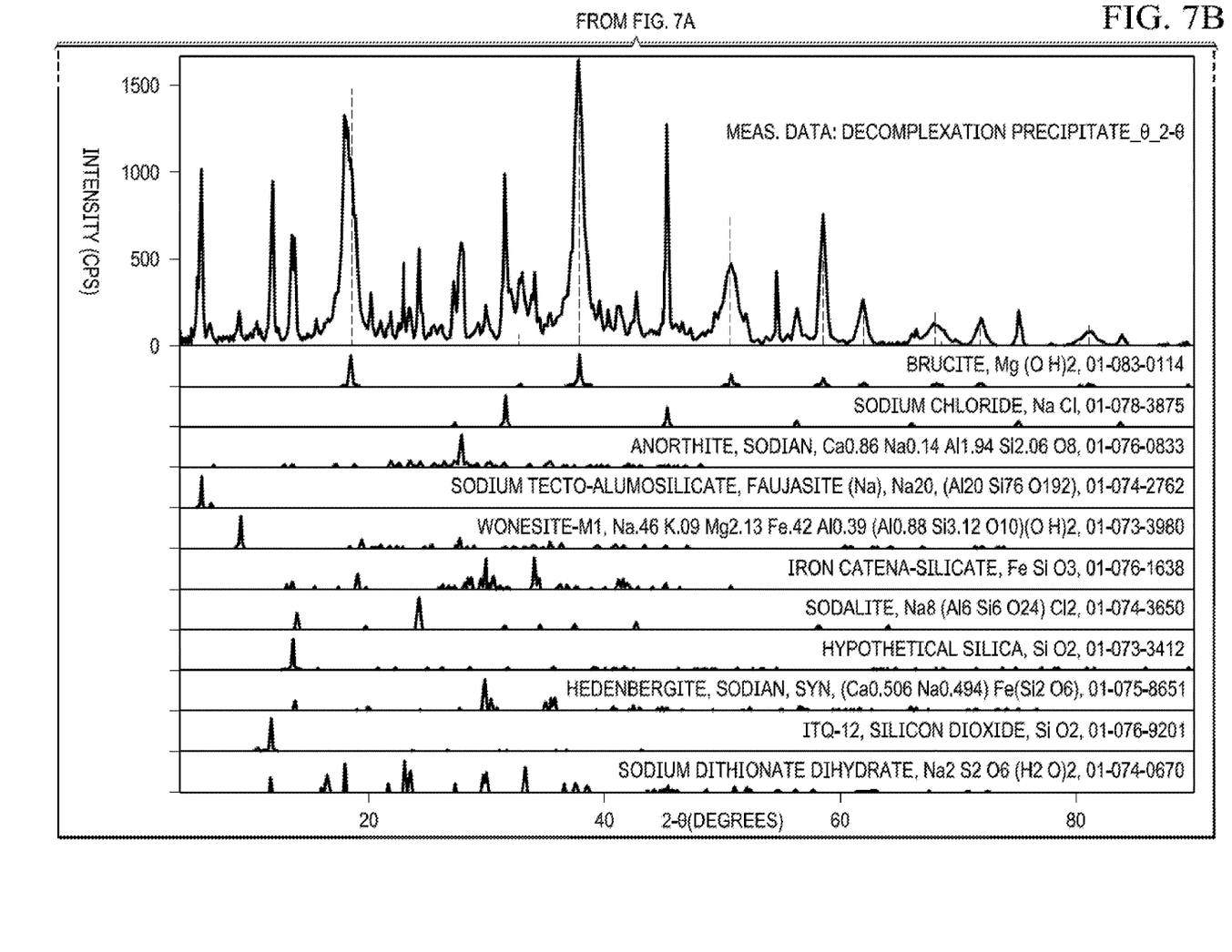

Chelators are known to persist in the environment. The most important process for the elimination of EDTA from surface waters is direct photolysis at wavelengths below 400 nm. Depending on the light conditions, the photolysis half-lives of Fe(III) EDTA in surface waters can range as low as 11.3 minutes up to more than 100 hours. Degradation of FeEDTA, but not EDTA itself, produces Fe complexes of ED3A, EDDA, and EDMA—92% of EDDA and EDMA biodegrades in 20 hours while the triacetate ED3A displays significantly higher resistance. Many environmentally abundant EDTA species (e.g., $Mg^{2+}$, $Ca^{2+}$) are more persistent. Some of the proposed degradation pathways for EDTA are shown in FIG. 6.

Herein, hydrogen peroxide is used to destroy the chelator, although light, ozone, and other methods can also contribute. The flowback containing chelator is treated with hydrogen peroxide to degrade the chelator. This can be done before or after removal of the metal hydroxide precipitant, but preferably is done after, as our tests show the destruction was much improved when performed with the metal already removed. The reaction chemistry of chelant decomposition is not fully known, but may proceed according to one or more of the reactions in FIG. 6.

In more detail, the invention includes any one or more of the following embodiments, in any combination(s) thereof:

A method of treating flowback from stimulating a SAGD well with chelators, said method comprising:
a. collecting a flowback from a SAGD well that has been stimulated by treatment with chelators, the flowback having a high concentration of metal-chelate;
b. treating the flowback with a base until at least 90% of the metal-chelate separates into chelator and metal, and the metal precipitates as a metal hydroxide, thus producing a supernatant;
c. optionally separating the supernatant containing the chelator from the metal hydroxide precipitate;
d. treating the supernatant with $H_2O_2$ until 90% of the chelator degrades; and
e. routing the treated supernatant to a central processing facility (CPF) for further treatment.

Any method herein described, wherein the collecting is in a tank at or near a wellhead, or in a pipeline downstream from a wellhead.

Any method herein described, wherein the separating step uses a flocculent or coagulant or both, or uses gravity segregation, or uses a filter, or uses combinations of same. The separating step can occur before or after the peroxide treatment step.

The chelator can be any known chelator, and is preferably EDTA or DTPA.

An improved method of treating flowback from stimulation of a well with chelator to remove metals, wherein an initial volume of flowback from the stimulated well that contains high volumes of metal-chelate are sequestered and disposed of in a hazardous waste disposal facility, the improvement comprising collecting the initial volume of flowback and treating it with a base to precipitate said metals, and then treating it with hydrogen peroxide such that 90% of the chelator and 90% of the metals are removed from the flowback, and then routing the treated flowback to the CPF.

A method of treating a production fluid comprising treating a production fluid comprising a crude oil and water emulsion plus metal-chelate with caustic to separate the metal-chelate into metal hydroxide and chelator, precipitating the metal hydroxide, treating a remaining production fluid with hydrogen peroxide to degrade the chelator, and routing a treated production fluid to a treatment facility for separating the water and the crude oil.

An improved method of treating flowback from stimulation of a well with chelator to remove metals, wherein an initial volume of flowback from the stimulated well that contains high volumes of metal-chelate is sequestered and disposed of in a hazardous waste disposal facility, the improvement comprising i) treating an initial volume of flowback with a base to precipitate the metals, ii) treating the flowback with hydrogen peroxide to decompose the chelator, iii) separating the metal precipitate from a flowback supernatant, and then iv) routing the flowback supernatent to the CPF, wherein the 90% of the metals and 90% of the chelator have been removed from the flowback supernatant as compared with the initial volume of flowback.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| CPF | Central processing facility |
| DTPA | diethylenetriamine pentaacetic acid |
| ED3A | Ethylenediamine triacetic acid |
| EDTA | ethylenediamine triacetic acid |
| GLDA | Glutamate Diacetate |
| HEEDTA | hydroxyethylethylenediamine triacetic acid |
| IC | Ion chromatography |
| ICP | Inductively Coupled Plasma |
| NTA | nitrilotriacetic acid |
| SAGD | Steam assisted gravity drainage |
| XRD | x-ray diffraction |

DETAILED DESCRIPTION

The invention provides a novel method of treating flowback from stimulated wells that has high levels of metal chelates. The flowback is shunted to a wellhead tank and treated with caustic until the metal chelates separate into metal hydroxides and chelator. The chelator is then degraded with the addition of hydrogen peroxide. The now treated flow has <90% of the original metal or chelator levels, and can be routed to the CPF and treated as any other production fluid. The invention has particular applicability to SAGD wells, which are susceptible to damage causes by the high temperature steam and sand and clay reservoirs, and thus are oft stimulated with chelators, but need not be so limited. Indeed, the method can be applied to any sand/clay based or EOR wells.

Early proof-of-concept experiments demonstrated that metal hydroxides will precipitate from EDTA complexes in distilled water (data not shown). A second proof-of-concept experiment, described here, was intended to test whether the decomplexation and EDTA degradation will take place in a SAGD emulsion as opposed to a purely aqueous solution. It will also test just oxidation of the EDTA by hydrogen peroxide in emulsion, without prior decomplexation of the metal and chelator.

To facilitate the observation of precipitation, the experiment used high concentrations of metals and chelator. First, we prepared a metal-chelate in a produced oil emulsion by mixing the following components in a stirred beaker:

i. 150 ml of Produced Emulsion (E-151216-0031)
ii. 24.6 g tetrasodium EDTA
iii. 12.54 g magnesium chloride hexahydrate
iv. NaOH added to solution as necessary to dissolve the ingredients We saved 10 ml samples for ICP and IC EDTA, as well as reserved about 40 ml of for later analysis.

Next, we tested NaOH decomplexation of the metal-chelates, followed by oxidation of the chelate. We also tested direct oxidation of the metal-chelate in oil emulsion. The methodology was as follows:

i. Titrate 50 mL of the metal-chelate in oil emulsion by adding NaOH and observe when precipitants appear. Use concentrated NaOH and add measured volumes (650 µL each) from a pipette.
ii. Note pH and conductivity of the metal-chelate in oil emulsion after each addition of NaOH. If no precipitant appears by pH=14, note that as well.
iii. Transfer fluid and any precipitant to a centrifuge tube and spin at 4000 rpm for 20 minutes to separate the supernatant from the precipitant. Note volume of precipitant and volume of supernatant.
iv. Combine 20 mL of supernatant with 20 mL of 3% hydrogen peroxide and stir for at least two hours.
v. Label and submit the $H_2O_2$ treated supernatant for ICP and IC EDTA analysis.

To test for direct oxidation, we combined 20 mL of metal-chelate in oil emulsion solution with 20 ml of 3% hydrogen peroxide and stirred for at least two hours. The experiment was otherwise as described above.

The samples are labelled as in Table 1:

TABLE 1

| Sample Description | |
| --- | --- |
| Sample ID | Sample Description |
| E170424-0002 | Initial chelated metal solution |
| E170424-0003 | Chelated metal solution after NaOH + $H_2O_2$ treatment |
| E170424-0004 | Chelated metal solution after NaOH + $H_2O_2$ treatment |

TABLE 1-continued

Sample Description

| Sample ID | Sample Description |
|---|---|
| E170424-0005 | Chelated metal solution directly oxidized with $H_2O_2$ |

The results are shown in Table 2. The caustic step removed >99% of the magnesium and 50% of the silicon. The silicon loss can be explained by the 50% dilution with hydrogen peroxide.

TABLE 2

Results

|  | Emulsion + Mg + EDTA E170424-0002 mg/l | After NaOH + H2O2 E170424-0004 mg/l | After H2O2 Only E170424-0005 mg/l |
|---|---|---|---|
| Al | <0.05 | <0.05 | <0.05 |
| B | 29 | 13 | 15 |
| Ba | <0.1 | <0.1 | <0.1 |
| Ca | 18.25 | 11.2 | 9.6 |
| Co | <0.1 | <0.1 | <0.1 |
| Cr | <0.1 | <0.1 | <0.1 |
| Cu | <0.1 | <0.1 | <0.1 |
| Fe | <0.1 | <0.1 | <0.1 |
| K | 12 | <0.05 | <0.05 |
| Li | <0.1 | <0.1 | <0.1 |
| Mg | 7258 | 43 | 3739 |
| Mn | <0.1 | <0.1 | <0.1 |
| Mo | <0.1 | <0.1 | <0.1 |
| Na | 25890 | 24320 | 13700 |
| Ni | <0.1 | <0.1 | <0.1 |
| P | <0.1 | 32 | 29 |
| S | 15 | 6.2 | 9 |
| Si | 42 | 21 | 19 |
| Sr | <0.1 | <0.1 | <0.1 |
| Ti | <0.1 | <0.1 | <0.1 |
| V | 21 | <0.1 | 11 |
| Zn | <0.1 | <0.1 | <0.1 |

Table 3 shows the levels of EDTA remaining in the final solutions. The proposed pathway is successful: treatment with caustic breaks the EDTA-Mg complex and precipitates the Mg as $Mg(OH)_2$. Successive treatment with $H_2O_2$ oxidizes the EDTA, thus degrading it and rendering the fluid safe for return to the CPF.

TABLE 3

Results

|  | EDTA mg/l |
|---|---|
| E1700424-0002 | 88826 |
| E1700424-0004 | 1778 |
| E1700424-0005 | 24291 |

Figure 8:
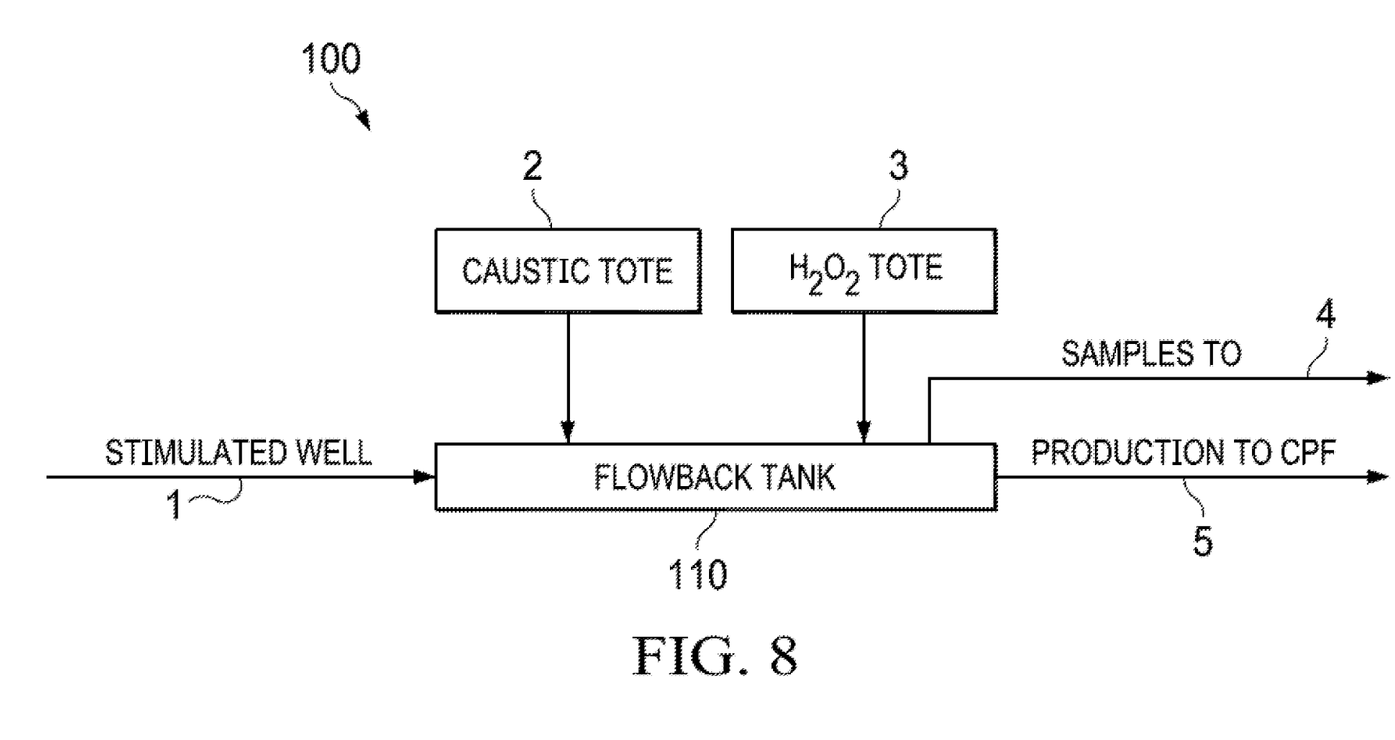
FIG. 8. Schematic of method and equipment used therein.

FIG. 8 shows a schematic of exemplary equipment for use in the method (100), but variations are possible. In FIG. 8, we see the flowback (1) coming from the stimulated well (arrow) to the flowback tank (110). NaOH (2) is added into the tank (100) and mixed therein, and then the peroxide (3) is added and mixed. Samples (4) can then be withdrawn for lab analysis, and the remaining solution directed to the central processing facility (5) to separate oil from brine, etc.

Although FIG. 8 shows the reaction occurring in a separate vessel, these reactions could also occur in the pipeline from the well, as it takes about 45" for oil to traverse the distance, depending on where the pad and CPF are located. In such a case, the reactants are routed into the flowback pipeline in the requisite order, caustic being closest to the well, and peroxide closer to the CPF. In such case, it may be necessary to pass the flowback through a settling tank in order to collect and separate the precipitants, and this can be done before or after peroxide treatment.

Although our preliminary results are very promising, we will continue this work to optimize the various parameters, including but not limited to:

Test with DTPA
Explore caustic dose and residence time
Explore hydrogen peroxide concentration, dose, and residence time
Explore reaction products and their side effects for the process
Explore alternate oxidizers, e.g. sodium hypochlorite
Explore particle size distribution and properties of precipitates; need for centrifugation or filtration
Explore direct oxidation
Explore analytical methods for field monitoring and control Once these parameters are optimized in bench-top experiments, the methodology will be confirmed in field trials.

Other chelator degradation methods may be combined herewith. These include ultraviolet light, which has been used to speed degradation, as has catalytic photooxidation processes, where a semiconductor like $TiO_2$ or iron doped $TiO_2$ is used and activated by means of ultraviolet light. Other methods include ozone, gamma rays, γ-radiolysis, TiO photocatalysis, $UV/O_3$, $UV/H_2O_2$, solar ferrioxalate/$H_2O_2$, UV/electrochemical treatment, Fenton treatment $H_2O_2$/Fe(II), CAT-driven Fenton reaction, $H_2O_2$ microwave-activated photochemical reactor treatment, among others.

In some embodiments, catalysts are added to speed the degradation of EDTA. Metallophthalocyanines (MePcS) are effective catalysts for e.g., EDTA and DTPA. The most effective catalytic system under neutral conditions was FePcS-$H_2O_2$. In laboratory-scale experiments, a catalyst/substrate/$H_2O_2$ molar ratio of 4:100:2000 was found to be optimal for aqueous solutions, while the effective reaction temperature was 40-60° C. Of course, conditions would need to be optimized for the complex emulsion that is flowback, but these data provide a useful starting point.

The following references are incorporated by reference in their entirety for all purposes.

Rämöä J. & Sillanpää M., Degradation of EDTA by hydrogen peroxide in alkaline conditions, Journal of Cleaner Production 9(3): 191-195 (2001).

Sillanpää M., Pirkanniemi K., & Sorokin A., Oxidation of EDTA with $H_2O_2$ catalysed by metallophthalocyanines, Environmental Technology 30(14): 1593-1600 (2009).

Kudrashou Y. V., STIMULATION DESIGN AND EVALUATION OF HIGH TEMPERATURE SAGD WELLS, Master's Thesis (2015), online at oaktrust.library.tamu.edu/bitstream/handle/1969.1/155536/KUDRASHOU-THESIS-2015.pdf?sequence=1 &isAllowed=y.

The invention claimed is:

1. A method of treating flowback from stimulating a SAGD well with chelators, said method comprising:
   a) collecting a flowback from a SAGD well that has been stimulated by treatment with chelators, said flowback having a high concentration of metal-chelate;
   b) treating said flowback with a base until at least 90% of said metal-chelate separates into chelator and metal, and said metal precipitates as a metal hydroxide, thus producing a supernatant;

c) optionally separating said supernatant containing said chelator from said metal hydroxide precipitate;

d) treating said supernatant with $H_2O_2$ until 90% of said chelator degrades; and e) routing said treated supernatant to a central processing facility for further treatment.

2. The method of claim 1, wherein said collecting is in tank at or downstream from a wellhead.

3. The method of claim 1, wherein said collecting is in a pipeline downstream from a wellhead.

4. The method of claim 1, wherein said separating step c uses a flocculent or coagulant or both.

5. The method of claim 1, wherein said separating step c uses gravity segregation.

6. The method of claim 1, wherein said separating step occurs after treatment step d.

7. The method of claim 1, wherein said separating step occurs before treatment step d.

8. The method of claim 1, wherein said separating step uses gravity segregation and uses a flocculent or coagulant or both.

9. The method of claim 1, wherein said separating step uses a filter.

10. The method of claim 1, wherein said chelator is ethylenediamine tetraacetic acid (EDTA).

11. The method of claim 1, wherein said chelator is diethylenetriamine pentaacetic acid (DTPA).

12. An improved method of treating flowback from stimulation of a well with chelator to remove metals, wherein an initial volume of flowback from said stimulated well that contains high volumes of metal-chelate are sequestered and disposed of in a hazardous waste disposal facility, the improvement comprising collecting said initial volume of flowback and treating it with a base to precipitate said metals, and then treating it with hydrogen peroxide such that 90% of said chelator and 90% of said metals are removed from said flowback, and then routing said treated flowback to a central processing facility.

13. An improved method of treating flowback from stimulation of a well with chelator to remove metals, wherein an initial volume of flowback from said stimulated well that contains high volumes of metal-chelate are sequestered and disposed of in a hazardous waste disposal facility, the improvement comprising i) treating an initial volume of flowback with a base to precipitate said metals, ii) treating said flowback with hydrogen peroxide to decompose said chelator, ii) separating said metal precipitate from a flowback supernatant, and then routing said flowback supernatant to a central processing facility, wherein said 90% of said metals and 90% of said chelator have been removed from said flowback supernatant as compared with said initial volume of flowback.

14. A method of treating a production fluid, comprising treating a production fluid comprising a crude oil and water emulsion plus metal-chelate with caustic to separate said metal-chelate into metal hydroxide and chelator, precipitating said metal hydroxide, treating a remaining production fluid with hydrogen peroxide to degrade said chelator, and routing a treated production fluid to a treatment facility for separating said water and said crude oil.

15. A method of treating flowback from stimulating a SAGD well with chelators, said method comprising:

a) collecting a flowback from a SAGD well that has been stimulated by treatment with chelators, said flowback having a high concentration of metal-chelate;

b) treating said flowback with a base until at least 90% of said metal-chelate separates into chelator and metal, and said metal precipitates as a metal hydroxide, thus producing a supernatant;

c) separating said supernatant containing said chelator from said metal hydroxide precipitate;

d) treating said supernatant with $H_2O_2$ until 90% of said chelator degrades; and e) routing said treated supernatant to a central processing facility comprising an oil and water separator, a water treatment unit, and a steam generator;

f) separating oil and water in said oil and water separator, treatment of said separated water in said water treatment unit, and generation of steam in said steam generator with said treated water with less fouling than a method without steps b-d).

* * * * *